INVENTOR
William R. Wickerham.

Dec. 12, 1950 W. R. WICKERHAM 2,533,412
ALTERNATING-CURRENT HOIST CONTROL
Filed May 24, 1949 2 Sheets-Sheet 2

WITNESSES:
Robert C. Baird
Nev. C. Groove

INVENTOR
William R. Wickerham.
BY C. M. Avery
ATTORNEY

Patented Dec. 12, 1950

2,533,412

UNITED STATES PATENT OFFICE 2,533,412

ALTERNATING-CURRENT HOIST CONTROL

William R. Wickerham, Buffalo, N. Y., assignor to Westinghouse Electric Corporation, East Pittsburgh, Pa., a corporation of Pennsylvania Application May 24, 1949, Serial No. 95,024

7 Claims. (Cl. 318—229)

1

My invention relates to control systems for alternating-current motors and, in a more specific aspect, to control systems for applications, such as on hoists, that require operating under overhauling motor loads.

It is an object of my invention to provide a motor control system of the type mentioned that permits adding one or several speed-torque steps to those obtainable by secondary resistance control alone and that, for this purpose, requires simpler control devices than those of known systems.

Another, more specific object of the invention is to provide an A.-C. motor control system capable of selectively handling an overhauling load under single-phase braking performance and three-phase driving performance while preventing or substantially reducing the transitory high currents apt to occur in known systems when switching between these two performance characteristics.

The invention also aims at devising a control system in accordance with the foregoing objects that, in addition, is automatically effective to limit the motor speed when the system is set for driving a load in the overhauling direction and that, for this purpose, requires speed-limiting means of extremely simple design and a minimum of relays or contactors.

These and other objects as well as the means, specified by the annexed claims, for achieving these objects in accordance with my invention will be apparent from the following description in conjunction with the drawings which show a semi-automatic hoist control system.

Figure 1:
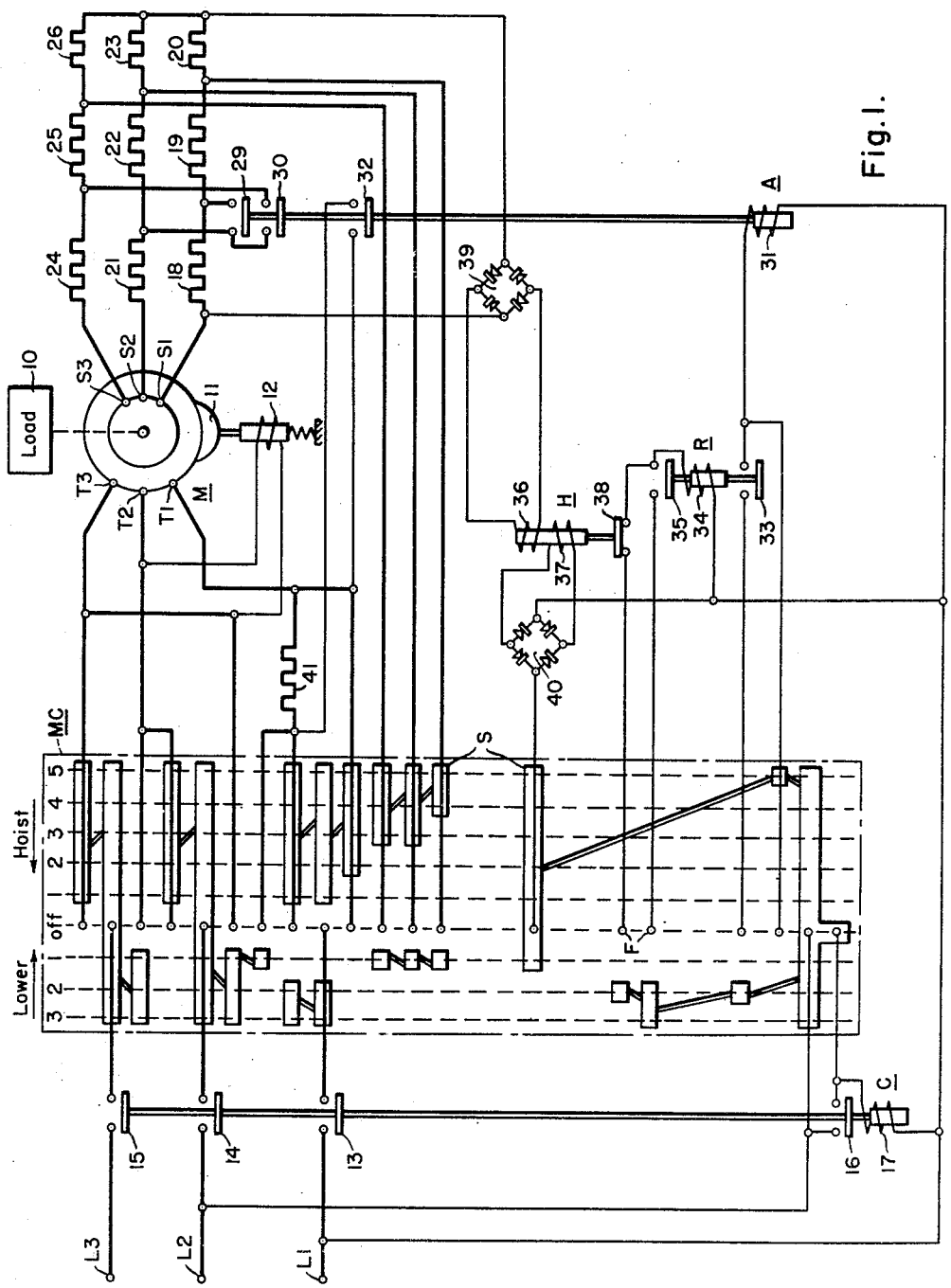
Figure 2:
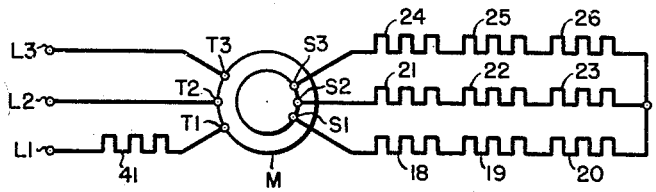
Figure 3:
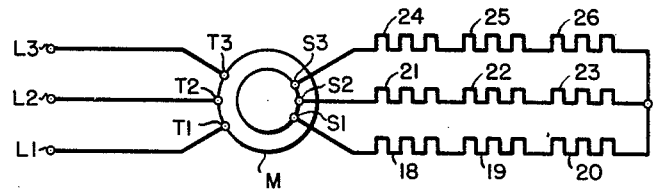

Fig. 1 illustrates a circuit diagram of the complete hoist control system. Figs. 2 to 6 show straight-line circuit diagrams of the power connections obtained at different settings of the master controller in the system of Fig. 1; and Fig. 7 is a coordinate diagram exemplifying typical speed-torque characteristics of the motor in the same system.

In Fig. 1 the line terminals of the system are denoted by L1, L2 and L3. The hoist motor M is of the wound rotor type and has three primary terminals T1, T2 and T3 and three secondary terminals S1, S2 and S3. The hoist machinery or load to be driven or braked by the motor is schematically shown at 10. The hoist motor is equipped with a normally set friction brake 11 which is magnetically releasable by a brake coil 12.

The connection of the motor terminals T1, T2 and T3 with the line terminals is controlled by a

2 master controller MC and a contactor C. The main contacts 13, 14 and 15 and a self-holding contact 16 of contactor C are controlled by a coil 17 whose circuit extends between line terminals L2 and L3 through a contact device of the master controller MC. The master controller is represented in developed form and exemplified by a drum contactor although it will be understood that controllers of other types, such as cam controllers or push-button controllers, may be used instead. The illustrated master controller is equipped with contact fingers such as those denoted by F, and contact segments such as those denoted by S. The master controller is selectively adjustable between an off position, five hoisting positions, and three lowering positions.

Connected to the secondary terminals, S1, S2, S3 of motor M is a resistance circuit composed of resistors denoted by 18 through 26. The resistors 20, 23 and 26 are connected with the master controller so that they are shorted out of the secondary motor circuit when the master controller is in the first position lowering or in the higher hoisting positions. The resistance of the secondary motor circuit is further controlled by the contacts 29 and 30 of a contactor A whose coil 31 also actuates a contact 32. The coil circuit for contactor A is controlled by the master controller MC and is also under control by a contact 33 of a locking relay R whose coil 34 controls also a contact 35.

The system is equipped with a speed limiting relay H which has two coils 36 and 37 for controlling a contact 38 in the coil circuit of relay R. Coil 36 is connected through a rectifier 39 across the resistors 18, 19 and 20 and hence is energized in accordance with voltage from the secondary motor circuit. The coil 37 is connected through a rectifier 40 under control by the master controller to an energizing circuit so that coil 37 is excited in all positions of the master controller except in the second and third lowering positions. Unless the master controller is adjusted to the second or third lowering position, the coil 37 is excited and maintains the contact 38 in normally open position. Coil 36 is sufficiently excited to hold the contact 38 open whenever the motor speed is below a critical value closely below synchronous speed. When the motor is running at a speed below the critical value while the master controller is being moved from position 1 lowering to position 2 lowering, the holding coil 37 becomes ineffective, but since at that time the coil 36 is excited by sufficiently high voltage the contact 38 remains nevertheless open and can drop into closed position only when the accelerating motor exceeds a given speed somewhat below synchronism. As will be explained in the following, the closing of contact 38 under the just mentioned conditions has the effect of energizing the relay R which in turn causes the contactor A to pick up and to readjust the control system so as to automatically limit the motor speed. The relay R, when thus picking up, seals itself in and thus operates as a blocking means which prevents any further operation of the speed limit relay H from having a control effect as long as the master controller remains in the second lowering position. In this manner the effectiveness of the speed limiting relay H is definitely limited to the desired response at the predetermined high subsynchronous speed and no further control effect can take place when the secondary motor voltage increases due to the motor exceeding its synchronous speed.

The system is further equipped with a resistor 41 which has one end permanently connected with the primary motor terminal T1. The other end of resistor 41 is connected, under control by the master controller MC, either with the line terminal L1 or with the motor terminal T2 depending upon the selected position of the master controller. In the illustrated example, the resistor 41 lies across motor terminals T1 and T2 only when the master controller is in the first lowering position. In the same position, the line terminals L2 and L3 are connected with motor terminals T3 and T2, respectively, while the line terminal L1 is disconnected from the motor. With this adjustment of the master controller the motor receives single-phase excitation, and the resistor 41 establishes a short circuit between two motor terminals in order to produce a braking field. The series connections of resistor 41 between motor terminal T1 and line terminal L1 occurs only when the master controller MC is in the second or third lowering position or in the first hoisting position. At the same time, the remaining two line terminals are connected to the remaining two primary terminals of the motor. Under these conditions the motor receives three-phase excitation which, due to the asymmetrical arrangement of the resistor 41, is unbalanced thus producing a lower torque than obtained under otherwise similar conditions by a balanced three-phase excitation. The above-mentioned contact 32 of contactor A is connected across the resistor 41. Consequently, when the contactor A reduces the secondary resistance of the motor due to a response of the speed limit relay H at point 2 lowering of the master controller, the resistor 41, previously series connected in the primary motor circuit, is shorted in order to increase the speed limiting effect.

The purpose and performance of the above-described system elements will be more fully understood from the following description of a hoisting and lowering operation.

Assume that the line terminals L1, L2 and L3 are energized due to the closing of a main switch (not illustrated) and that the master controller MC is in the illustrated off position. Then the contactor C is picked up because its coil 17 is energized through the master controller from line terminals L1 and L2. Contactor C closes its main contacts 13, 14 and 15 and seals itself in at contact 16. Consequently, when thereafter the master controller is moved away from the off position, the contactor C remains picked up until either the line terminals are deenergized or the line voltage drops below a safe value. In either event the contactor C will again pick up only if the master controller is first placed in the off position. The holding coil 37 of the speed limit relay H is also energized from line terminals L1 and L2 through the master controller MC and through the rectifier 40. Consequently, the contact 38 is open. When the master controller is moved to the first hoisting position, it connects line terminal L2 with motor terminal T2, and line terminal L3 with motor terminal T3. Line terminal L1 is connected through the master controller to motor terminal T1 in series with the resistor 41. The brake coil 12 (Fig. 1) is excited between motor terminals T2 and T3 so that the brake is lifted. This is also the case in all other hoisting and lowering positions of the master controller. All resistors 18 through 26 are connected in the secondary motor circuit. The power connections of the motor thus established are in accordance with Fig. 2. Due to the unbalanced excitation caused by the series resistor 41, the motor is energized for low-torque operation in the hoisting direction. The corresponding speed-torque characteristic is exemplified by curve H1 in Fig. 7.

When the master controller is moved to point 2 hoist, the controller short circuits the resistor 41 so that terminals L1 and T1 are directly connected with each other. No other change occurs in the system so that the power connections now obtaining are in accordance with Fig. 3. The motor receives balanced three-phase excitation for increased torque, for instance, in accordance with the speed torque characteristic H2 in Fig. 7.

At point 3 hoist, the secondary resistors 23 and 26 are shorted in the master controller thus increasing the motor torque for any given speed. The corresponding motor characteristic is exemplified by curve H3 in Fig. 7.

At point 4 hoist the resistor 20 is also shorted in the master controller, resulting in a speed torque characteristic similar to curve H4 in Fig. 7.

At point 5 hoist of the master controller, the circuit for coil 31 of contactor A is closed in the master controller. Contacts 29 and 30 of contactor A short the resistors 19, 22 and 25 so that only the resistors 18, 21 and 24 remain in the motor circuit. The corresponding speed torque characteristic for maximum torque conditions is typified by curve H5 in Fig. 7.

Figure 4:
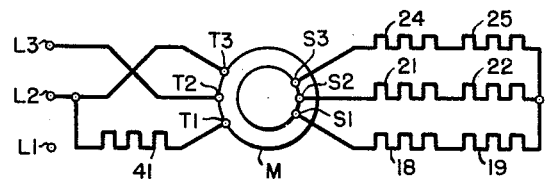

Starting again from the off position, the adjustment of the master controller to point 1 lowering has the following effects. Controller MC connects line terminal L2 to motor terminal T3, and line terminal L3 to motor terminal T2. Line terminal L1 remains disconnected, and resistor 41 is connected across motor terminals T1 and T3. Controller MC also shorts the secondary resistors 20, 23 and 26. The motor circuit thus established is shown in Fig. 4. As mentioned above, the motor receives single-phase excitation, and the primary windings shorted by the resistor 41 develop a braking field. The magnitude of the secondary resistance now effective is preferably rated to obtain optimum braking performance. A speed torque characteristic typical for such single-phase braking performance is exemplified by curve D1 in Fig. 7.

Figure 5:
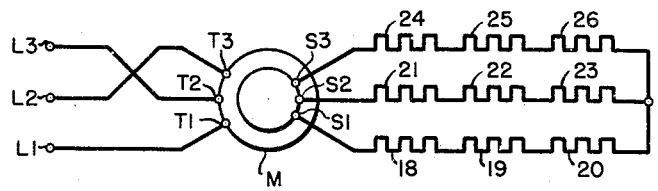

When the controller MC is advanced to point 2 lowering, the line terminals L2 and L3 are connected to respective motor terminals T3 and T2 as before, but the controller MC now connects the resistor 41 in series between line terminal L1 and motor terminal T1. The motor now receives unbalanced three-phase energization for low-torque operation in the lowering direction. Controller MC disconnects the coil 37 of speed limiting relay H from its current supply. However, as long as the lowering speed remains appreciably below the synchronous value, coil 36 receives sufficiently high voltage from across the secondary resistors 18—19—20 to keep relay H picked up. The motor circuit is shown in Fig. 5, and the performance of the motor is exemplified by the speed torque characteristic D2 in Fig. 7.

However, if the speed of an overhauling load is permitted to exceed a given high value slightly below synchronism, the voltage across resistors 18—19—20 drops below the critical pick up value for relay H. The relay drops out and its contact 38 closes the circuit for coil 34 in relay R. Relay R closes its holding contact 35 while contact 33 provides excitation for the coil 31 of contactor A. Contact 32 of contactor A shorts the resistor 41, and contacts 29 and 30 short the secondary resistors except resistors 18, 21 and 24. Consequently, when the speed limit relay H responds, the motor circuit is automatically changed from the condition represented in Fig. 5 to that shown in Fig. 6. The motor now receives balanced three-phase excitation under such secondary resistance conditions that the motor tends to run near synchronous speed within the available range of torques. Thus the motor speed is automatically limited to a value near synchronism in accordance with the typical characteristic D3 in Fig. 7. It will be noted that once the relay R has responded, its coil circuit remains closed through the self-holding contact 35 as long as the master controller is in position 2 lowering. Consequently, the relay R operates as a blocking means and renders the relay H ineffective. In this manner the relay H is prevented from the affecting the automatic speed limitation if the motor speed should increase above synchronism and thus cause the relay H to pick up.

Figure 6:
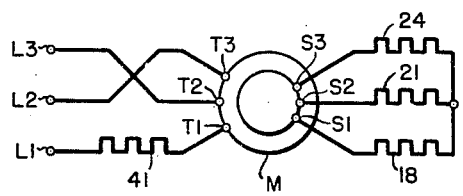
Figure 7:
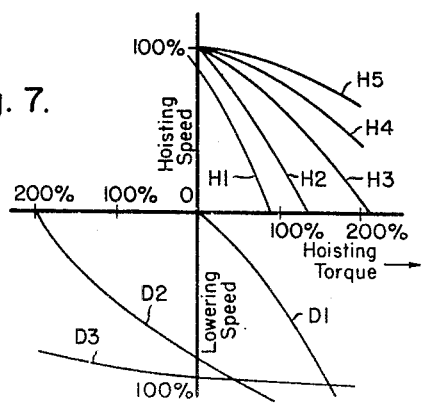

If the master controller is turned from point 2 to point 3 lowering after relays H, R and contactor A have responded and the motor is running near synchronous speed according to Fig. 6 and characteristic D3 in Fig. 7, no change occurs and the motor continues running in the same manner, i. e., at a speed limited to approximately the synchronous value. However, when the master controller is moved from point 2 to point 3 lowering before the speed limiting relay H drops out, for instance, if the controller is rapidly moved from the off position or point 1 lowering to point 3, the circuit for coil 34 and contact 38 is opened in the controller MC before relay R is caused to pick up. Consequently, the motor is then connected in the same manner as at point 2 lowering, except that relay R and contactor A cannot pick up. As a result the motor circuit according to Fig. 5 is maintained and the motor operates in accordance with the speed torque characteristic D2 in Fig. 7 regardless of the lowering speed. Thus a load, if sufficiently overhauling, is permitted to accelerate downwardly to speeds above synchronism.

Reviewing the foregoing performance it will be recognized that in accordance with the invention the resistor 41 has several essential functions. When connected across the motor terminals T1 and T3 (point 1 lowering, Fig. 4, curve D1 in Fig. 7) the resistor 41 forms part of a braking field circuit for single-phase braking performance. When series connected in one of the primary phase leads, the resistor 41 serves to provide unbalanced three-phase energization for low torque operation (point 1 hoist, Fig. 2, curve H1 in Fig. 7, and position 2 lowering, Fig. 5, curve D2 in Fig. 7). During the transfer from point 1 to point 2 lowering (i. e., changing from the circuit of Fig. 4 to that of Fig. 5), the resistor 41 cushions and limits possible overload currents and prevents them from assuming short circuit magnitude. The resistor 41 also serves to provide one or more operating steps (position 1 hoist, Fig. 2) in addition to those obtainable by the change of secondary resistance alone.

While these various functions, without departure from the more general features of the invention, can be performed by several resistors, it will be understood from the above-described embodiment that, in accordance with a more particular feature of the invention, a single resistor is sufficient to take care of all of these functions.

As is generally the case in motor control systems of the above-described type, the number of speed positions in both running directions of the motor is more or less arbitrary and determined by the requirements of each particular application. Consequently, if desired, the number of speed steps in the hoisting or lowering direction may be changed. For instance, several single-phase braking steps may be provided differing from each other by different amounts of resistance in the rotor circuit or by having the resistor 41 inserted or shorted out of the primary circuit.

A comparison of Fig. 5 with Fig. 6 shows that the relays for automatically limiting the motor speed at point 2 lowering have the effect of varying the amount of resistance effective on the primary side of the motor and at the same time change the effective amount of resistance in the secondary motor circuit. It is obvious that for some purposes only an automatic change of resistance on the primary side or only a change of the secondary resistance suffices. For instance, if the contact 32 of contactor A in Fig. 1 is omitted only the secondary resistance is reduced, and if the contacts 29 and 30 are omitted only the primary circuit is affected.

As exemplified by the illustrated embodiment a system according to the invention can be designed with a minimum of relays and contactors. As a matter of fact, the illustrated embodiment involves the operation of electromagnetic devices only at point 5 hoist and point 2 lowering.

It will be obvious to those skilled in the art after a study of this disclosure that the invention permits various embodiments and modifications other than those specifically illustrated and described without departing from the essential features of the invention and within the scope of the claims annexed hereto.

I claim as my invention:

1. An alternating-current motor control system comprising a three-phase motor having three terminals, three line terminals, resistance means, control means attached to said motor terminals and line terminals and resistance means and having selectively adjustable control conditions, said control means connecting only two motor terminals to only two respective line terminals and connecting said resistance means between one of said two motor terminals and the third motor terminal when in one of said control conditions, and said control means connecting said three line terminals to said respective three motor terminals and connecting said resistance means between one motor terminal and the appertaining one line terminal when in another control condition.

2. An alternating-current motor control system, comprising a three-phase motor having three terminals, three line terminals, a resistor, control means attached to said motor terminals and line terminals and resistor and having selectively adjustable control conditions, said control means connecting only two motor terminals to only two respective line terminals and connecting said resistance means between one of said two motor terminals and the third motor terminal in one of said control conditions, and said control means connecting said two line terminals to said respective two motor terminals and connecting said resistor in series between the third line terminal and the third motor terminal in another control condition immediately adjacent to said one condition.

3. An alternating-current motor control system, comprising a three-phase motor having three terminals, three line terminals, resistance means, a master controller having selectively adjustable control positions and being attached to said line terminals and motor terminals and resistance means, said controller having contacts connecting only two line terminals to two respective motor terminals and connecting said resistance means between one of said two motor terminals and the third motor terminal when said controller is in one of said positions, and said contacts connecting said two line terminals to said two respective motor terminals and connecting said resistance means in series between said third motor terminal and said third line terminal when said controller is in another position immediately adjacent to said one position.

4. An alternating-current motor control system, comprising a three-phase wound-rotor motor having three terminals and a secondary resistance circuit, three line terminals, a resistor, selective control means having a multiposition master controller and having contact means connecting two motor terminals to two respective line terminals and connecting said resistor between the third motor terminal and the third line terminal when said controller is in a given position, a relay connected with said secondary circuit and responsive to an electric condition of said circuit indicative of a given speed value, first contact means and second contact means both connected with said relay to be controlled thereby, said first contact means being connected across said resistor for shorting said resistor when said relay responds, and said second contact means being connected across said resistance circuit for at least partly shorting said circuit when said relay responds.

5. An alternating-current hoist control system, comprising a three-phase motor having a primary energizing circuit and a secondary resistance circuit, master control means having selective hoist and lowering positions and having reversing contacts connected with said primary circuit for controlling the phase sequence of said primary circuit, said master control means having additional contact means connected with said secondary circuit to control the resistance of said secondary circuit dependent upon the selected position of said master controller, a relay having two coils and having contacts controllable by said coils and connected with said secondary circuit for varying the resistance of said secondary circuit to limit the motor speed due to responsive action of said relay, said controller having contact means connected with one of said coils for exciting it in given positions of said controller so that said one coil permits said responsive action only when said controller is in at least one predetermined lowering position, and said other coil being connected with said secondary circuit to cause said action when the voltage of said secondary circuit drops below a value corresponding to a given high motor speed.

6. An alternating-current motor control system, comprising a wound-rotor motor having primary terminals and a secondary resistance circuit, a resistor, control means connecting said resistor with said terminals, contactor means having a contact movable between two positions and connected across said resistor for shorting said resistor when in only one of said positions, relay means attached to said secondary circuit to be controlled by voltage of said circuit and connected with said contactor means for controlling said contact to assume either of said positions depending upon the direction of departure of said voltage from a given value thus automatically limiting the speed of said motor.

7. In a motor control system according to claim 1, said motor having a secondary resistance circuit, a speed-limit relay connected with said circuit to respond to a given voltage obtaining in said circuit near synchronous motor speed, a contact means under control by said relay and connected across said resistance means when said control means is in said other control condition for shorting said resistance means when said relay responds to said voltage, locking means connected with said contact means and connected with said control means and said speed-limit relay for locking said contact means to maintain said resistance means shorted after response of said speed-limit relay as long as said control means remains in said other control conditions.

WILLIAM R. WICKERHAM.

REFERENCES CITED

The following references are of record in the file of this patent:

UNITED STATES PATENTS

| Number | Name | Date |
|---|---|---|
| 1,712,520 | Roebel | May 14, 1929 |
| 2,408,461 | Wickerham | Oct. 1, 1946 |
| 2,460,037 | Seeger | Jan. 25, 1949 |
| 2,460,234 | Myles | Jan. 25, 1949 |